United States Patent

Tajika et al.

Patent Number: 5,528,270
Date of Patent: Jun. 18, 1996

[54] METHOD FOR CORRECTING DENSITY UNEVENNESS FOR A RECORDING HEAD AND AN IMAGE FORMATION APPARATUS PROVIDED WITH SUCH A METHOD

[75] Inventors: Hiroshi Tajika; Masato Katayama; Noribumi Koitabashi, all of Yokohama; Miyuki Matsubara, Tokyo, all of Japan

[73] Assignee: Canon Kabushiki Kaisha, Tokyo, Japan

[21] Appl. No.: 416,470

[22] Filed: Apr. 4, 1995

Related U.S. Application Data

[63] Continuation of Ser. No. 941,178, Sep. 4, 1992, abandoned.

[30] Foreign Application Priority Data

Sep. 11, 1991 [JP] Japan ..................... 3-231645

[51] Int. Cl.$^6$ ........................................ B41J 2/05
[52] U.S. Cl. ........................................ 347/19; 347/6
[58] Field of Search ............................ 347/19, 6

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,734,762 | 3/1988 | Aoki et al. | 358/80 |
| 4,740,796 | 4/1988 | Endo et al. | 346/1.1 |
| 4,829,379 | 5/1989 | Takaki | 358/163 |
| 5,038,208 | 8/1991 | Ichikawa et al. | 358/75 |
| 5,276,459 | 1/1994 | Danzuka et al. | 346/140 R |
| 5,343,231 | 8/1994 | Suzuki | 347/14 |
| 5,353,052 | 10/1994 | Suzuki et al. | 347/19 |

FOREIGN PATENT DOCUMENTS

| | | |
|---|---|---|
| 0399668 | 11/1990 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 61-123985 | 6/1986 | Japan . |
| 61-283275 | 12/1986 | Japan . |
| 2036958 | 2/1990 | Japan . |

*Primary Examiner*—Benjamin R. Fuller
*Assistant Examiner*—Valerie Ann Lund
*Attorney, Agent, or Firm*—Fitzpatrick, Cella, Harper & Scinto

[57] ABSTRACT

An image formation apparatus provided according to the present invention does not generate any printing density streaks in low density areas of an image and is therefore capable of outputting stabilized images without any density unevennesses and density streaks in any tonality. The apparatus is structured so as to correct density signals in accordance with a correction table 1 for indicating the recording characteristics of each of the recording elements of the head and the recording characteristics indicated by this correction table 1, and to drive the recording head in accordance with a correction table 2, which does not allow the foregoing corrections to be made when the density signals are lower than a given density, and the density signals corrected by this correction table 2.

37 Claims, 18 Drawing Sheets

FIG.6

(TABLE FOR 80 H)

| A\B | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 00 | 2B | 23 | 1D | 24 | 2D | 2D | 25 | 26 | 29 | 25 | 1F | 1D | 1F | 1F | 20 | 22 |
| 16 | 23 | 23 | 24 | 24 | 22 | 1F | 20 | 26 | 26 | 21 | 1E | 1D | 1C | 1A | 1B | 21 |
| 32 | 27 | 2A | 25 | 20 | 1D | 1E | 1C | 1B | 1B | 1E | 20 | 1E | 1D | 1E | 1C | 17 |
| 48 | 15 | 18 | 1B | 1F | 20 | 22 | 20 | 1A | 17 | 17 | 1A | 1E | 1F | 1F | 20 | 1D |
| 64 | 18 | 16 | 18 | 1E | 21 | 20 | 1D | 1D | 1F | 22 | 21 | 1F | 1C | 18 | 17 | 1E |
| 80 | 27 | 26 | 21 | 22 | 27 | 28 | 24 | 20 | 1C | 1C | 1D | 1C | 1D | 1F | 22 | 24 |
| 96 | 20 | 1D | 1F | 24 | 2A | 2A | 27 | 25 | 24 | 24 | 27 | 27 | 26 | 20 | 19 | 16 |
| 112 | 1C | 24 | 27 | 25 | 21 | 20 | 20 | 25 | 28 | 23 | 1C | 1C | 25 | 2E | 31 | 2D |

—TABLE 0 ---TABLE 10 - ·TABLE 20 — TABLE 32 —TABLE 50 —TABLE 60

—TABLE 0 ---TABLE 10 - ·TABLE 20 — TABLE 32 —TABLE 50 —TABLE 60

DENSITY : 40H

DENSITY : 80H

DENSITY : C0H

DENSITY : F0H

WITH OFFSET

WITHOUT OFFSET

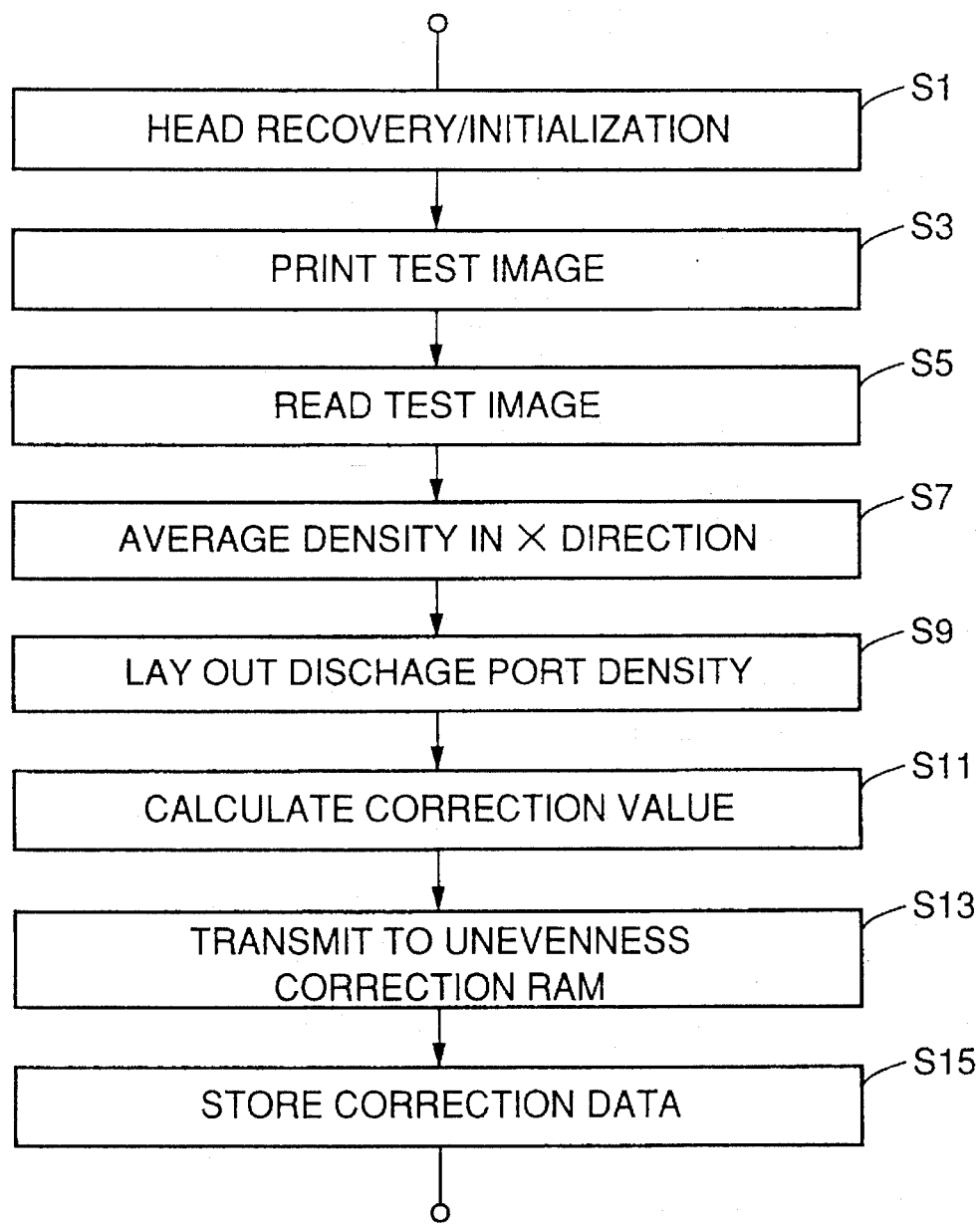

METHOD FOR CORRECTING DENSITY UNEVENNESS FOR A RECORDING HEAD AND AN IMAGE FORMATION APPARATUS PROVIDED WITH SUCH A METHOD

This application is a continuation of application Ser. No. 07/941,178 filed Sep. 4, 1992, now abandoned.

BACKGROUND OF THE INVENTION

1. Field of the Invention

The present invention relates to an image formation apparatus which performs the correction of the density unevenness due to the fluctuation of the discharging amount and the like per nozzle in a recording head. Particularly, the invention is effectively applicable to an image formation apparatus using a thermal ink jet recording head with an arrangement of a plurality of nozzles or a color image recording apparatus using a plurality of recording heads.

2. Related Background Art

Traditionally, image formation apparatuses which perform recordings on a sheet, OHP sheet, or other recording media (hereinafter referred to as a recording sheet or simply as a sheet) have been proposed in a mode to mount a recording head thereon according to various types of recording methods. For such a recording head, there are a wire dot type, thermo-sensitive type, thermal transfer type, ink jet type, and the like. Particularly, the ink jet type recording head is constructed in such a way that ink is ejected directly upon a recording sheet. This type of recording, therefore, attracts the user's attention as a quiet recording method and also as a method the running cost of which is inexpensive.

In order to eliminate the density variations and the generation of the density unevenness among the discharging performances, the following method is adapted for an ink jet recording apparatus to implement the stabilization of its discharging characteristics with respect to the discharging velocity and the orientational capability (impact precision) and discharging amount V DROP (pl/dot).

1. Method for controlling discharging amounts

This is a separated pulse width modulation method (PWM control method) such as proposed by the applicant hereof in the specification of U.S. patent application Ser. No. 821,773 (filed on Jan. 16, 1992), in which the pulse width of a prepulse is varied in accordance with the temperatures of a recording head, thus controlling the fluctuation of the discharging amount due to the temperature variation.

2. Method for correcting density unevenness

This is a method whereby to read the density unevenness of a test pattern printed by a recording head for the correction of the density signal per nozzle (discharging port), the so-called head shading method: an HS method.

For the method in the paragraph 1, an averaged discharging amount of a head is controlled in a serial printing system. It is therefore possible to eliminate the density variations due to the temperatures varying in a page or between pages. However, it is impossible to correct the density unevenness possessed by the head itself (the unevenness present in the connecting direction by the serial printing system), that is, the unevenness resulting from the discharging amount per nozzle of the head.

The uneven discharging amount per nozzle results from difficulties in manufacturing the nozzles of recording head, recording elements, and the like due to the unevenness of properties brought about by the manufacturing processes of recording heads or from the property unevenness of the materials with which the heads are constructed. Thus, because of such unevenness existing in the nozzles, recording elements, and the like, the sizes and densities of dots become uneven; hence generating the density unevenness in a recording image.

Because of this, it is difficult to eliminate the density unevenness for the nozzles of the head completely. Therefore, in the serial printing system, there occurs the density unevenness having the serial connections as its pitches and particularly, in an image of an even tone, the unevenness becomes conspicuously noticeable.

The method in the paragraph 2 is a method for overcoming the drawbacks existing in the one in the paragraph 1. This is the method proposed by the applicant hereof in U.S. Pat. No. 5,038,208 (filed on Nov. 15, 1988), U.S. patent application Ser. No. 480,041 (filed on Feb. 14, 1990) and Ser. No. 516,129 (filed on Apr. 27, 1990), in which the unevenness correction (HS method) is made for a certain predetermined output pattern (density signals being constant), and the uneven discharging amounts between nozzles of a head are also reduced to a certain extent. For this method, the corrections are made for a given pattern (the pattern determined by a combination of specific nozzles). Accordingly, it is possible to eliminate the density unevenness completely in the vicinity of the location where the density of such a pattern is present by use of a correction table 1 (the table representing the distributions of the discharging amounts of a recording head, that is, a table showing the characteristics of discharging amount per nozzle) and a correction table 2 (the table for correcting the density signals in accordance with the selected characteristic). However, if the correction is only for one determined density, the combination of nozzles used for the head is automatically confined whereas the combinations of nozzles are caused to change from moment to moment in service when a printing ratio varies. As a result, there still occurs a state of the density unevenness when the printing ratio changes rapidly or a low printing ratio or a high printing ratio is required. Accordingly, the correction table 2 which is available only for linear corrections cannot cope with the situation and then density unevenness occurs or the state of density unevenness varies according to the recording agent (ink or the like) or the colors thereof. Hence, it becomes necessary to provide a method for correcting the density unevenness for each color for the entire area ranging from the low to high densities.

Also, when the above-mentioned methods are applied to the entire area, the density unevenness or streaks occur with respect to the correction table 1 on the contrary particularly if the output of an even density is attempted in the low density area.

Therefore, when an ink jet recording apparatus is operated by use of image signals (multi-valued data) through external equipment such as a character reader, the resultant density streaks are generated in the printing in a low density area if pictorial color image or the like is printed. When a printing is performed in such a state, the full color images formed by the four colors, cyan, Magenta, yellow, and black, are caused to generate density streaks repeated at the boundaries in the serially connected portions; thus lowering the image quality significantly. Further, since the corrections for the density unevenness from the low to high density portions are given exceedingly or insufficiently, the color balancing is locally out of order for the area of an even tone such as a blue sky, sunset sky, or the skin of an object person. As a result, coloring tone is varied to cause the appearance of color unevenness or color reproducibility is lowered (that is, difference in color is more enhanced); hence degrading the image quality. Also, there is a problem among others that the density unevenness takes place even in a monochromatic image of black, red, blue, green, and the like.

SUMMARY OF THE INVENTION

The present invention is designed to solve the above-mentioned problems. It is an object of the invention to provide an image formation apparatus capable of outputting images without any density unevennesses or density streaks by correcting the uneven discharging amount per nozzle of the recording head and particularly, capable of outputting stabilized images even in a low density area.

In order to achieve the above-mentioned object, an image formation apparatus, having a recording head with a plurality of recording elements arranged therein for performing the formation of images by carrying a recording head relatively with respect to a recording medium in the direction different from the arranging direction of the foregoing plural recording elements, comprises the following according to the present invention:

a first correction means for indicating the recording characteristics of the recording elements of the aforesaid recording head;

a second correction means for correcting density signals being supplied to the aforesaid recording head on the basis of the recording characteristics indicated by the aforesaid first correction means and for reducing the ratio of the aforesaid corrections when the density signals are lower than a given density; and driving means for driving the recording head on the basis of density signals corrected by the aforesaid second correction means.

It is another object of the present invention to provide an image formation apparatus capable of outputting stabilized images without any density unevennesses and density streaks in all the tones in addition to achieving the foregoing object.

In order to attain such an object as this, an image formation apparatus, having a recording head with a plurality of recording elements arranged therein for performing the formation of images by carrying a recording head relatively with respect to a recording medium in the direction different from the arranging direction of the foregoing plural recording elements, comprises the following according to the present invention:

a first correction table for indicating the density characteristics of each of the recording elements of the aforesaid recording head;

a second correction table for correcting density signals being supplied to the aforesaid recording head on the basis of the density characteristics indicated by the aforesaid first correction table; and density correction means for correcting the aforesaid density signals in accordance with the aforesaid first correction table and second correction table, this density correction means being not allowed to make any correction of the aforesaid density signals when these signals indicate a density lower than a given density.

Also, in order to achieve this object, the image formation apparatus according to the present invention is characterized in that the foregoing second correction table is arranged to make the correction amounts different in accordance with the foregoing density signals.

It is still another object of the present invention to provide a method for correcting density unevenness so that the recording head is not caused to generate any density unevenness in a low density area of an image and also in an image of any tones.

In order to achieve the above-mentioned object, a method for correcting density unevenness for an image formation apparatus, having a recording head with a plurality of recording elements arranged therein, carrying means for carrying a recording head relatively with respect to a recording medium in the direction different from the arranging direction of the foregoing plural recording elements, and driving means for driving the aforesaid recording head by supplying image signals to the aforesaid recording head while the recording head is being carried by the aforesaid carrying means, comprises the following according to the present invention:

a signal reception step for receiving image signals;

a correction signal generation step for generating correction signals to make corrections corresponding to each of the aforesaid recording elements in accordance with the recording characteristics of each of the recording elements of the aforesaid recording head;

a correction step for correcting aforesaid image signals by the aforesaid correction signals; and a printing step for supplying the corrected image signals in the aforesaid correction step to the aforesaid recording head to perform printing by the aforesaid driving means, wherein when the aforesaid image signals indicate a density lower than a given density, the ratio of the aforesaid correction is reduced in the aforesaid correction step.

BRIEF DESCRIPTION OF THE DRAWINGS

FIG. 6 is a view showing a correction table 1 according to the present invention.

FIG. 13 is a flowchart showing an example of the correction processing procedures.

DETAILED DESCRIPTION OF THE PREFERRED EMBODIMENTS

Hereinafter, with reference to the accompanying drawings, the detailed description will be made of the embodiments of an image formation apparatus according to the present invention.

(Embodiment 1)

Figure 1:
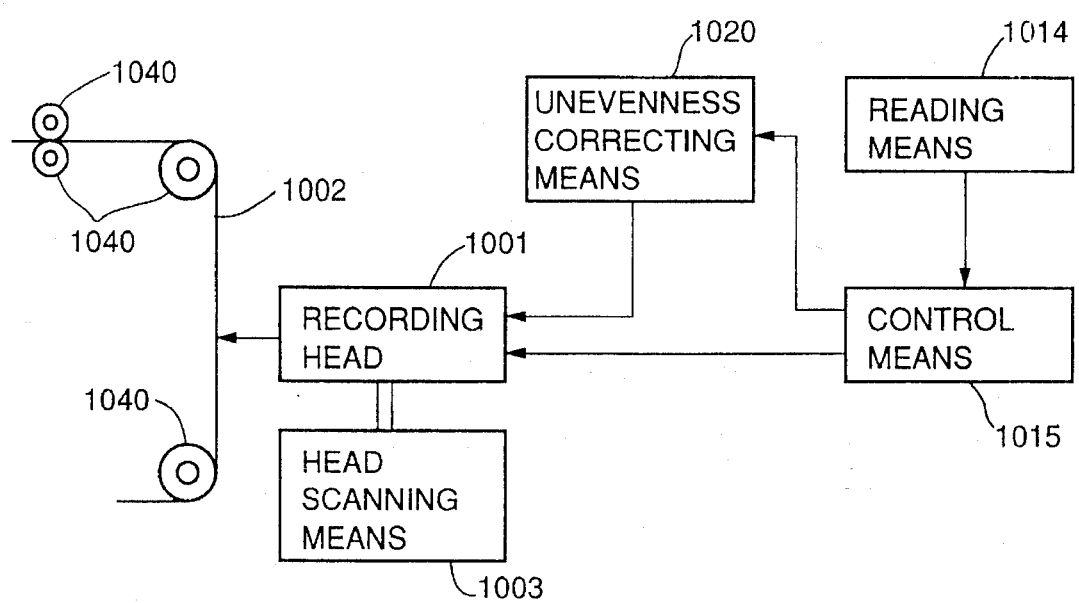
FIG. 1 is a block diagram schematically showing a structure according to the present invention.

FIG. 1 is a view showing a process flow representing the characteristics of the present invention, in which a reference numeral 1001 designates one or plural recording heads corresponding to the mode of an image formation apparatus. The recording head is of a multinozzle type (having a plurality of discharging ports). In the present embodiment, four ink jet recording heads of a serial recording type, each for cyan, magenta, yellow, and black, are used and are applied to a color image formation apparatus. In FIG. 1, a reference numeral 1003 designates means for scanning the recording head upon a recording medium (a member on which recording is made) 1002; 1040, means for carrying the recording medium 1002 relative to the recording position of the recording head 1001; 1014, means for reading the printing pattern used for correcting unevenness, which is commonly used as reading means for reading originals to perform image processing in the present embodiment and here comprises a light source (halogen lamp) for irradiating light upon the originals (printed object or patterns printed on a recording medium) and a reading unit (lens and CCD sensor) for reading the reflected rays of light therefrom; 1020, means for correcting density unevenness, which performs image recording while carrying on processing to correct unevenness for the head usually at the time of recording on the basis of the data on the density unevenness read from the pattern for the correction of the density unevenness (the method with respect to this event will be described later in detail); and 1015, printing control means for producing the correction data on the density unevenness by means of a CUP (microcomputer) and performing the modification of the driving condition of the recording head and other control with respect to the printing or the like.

Figure 2:
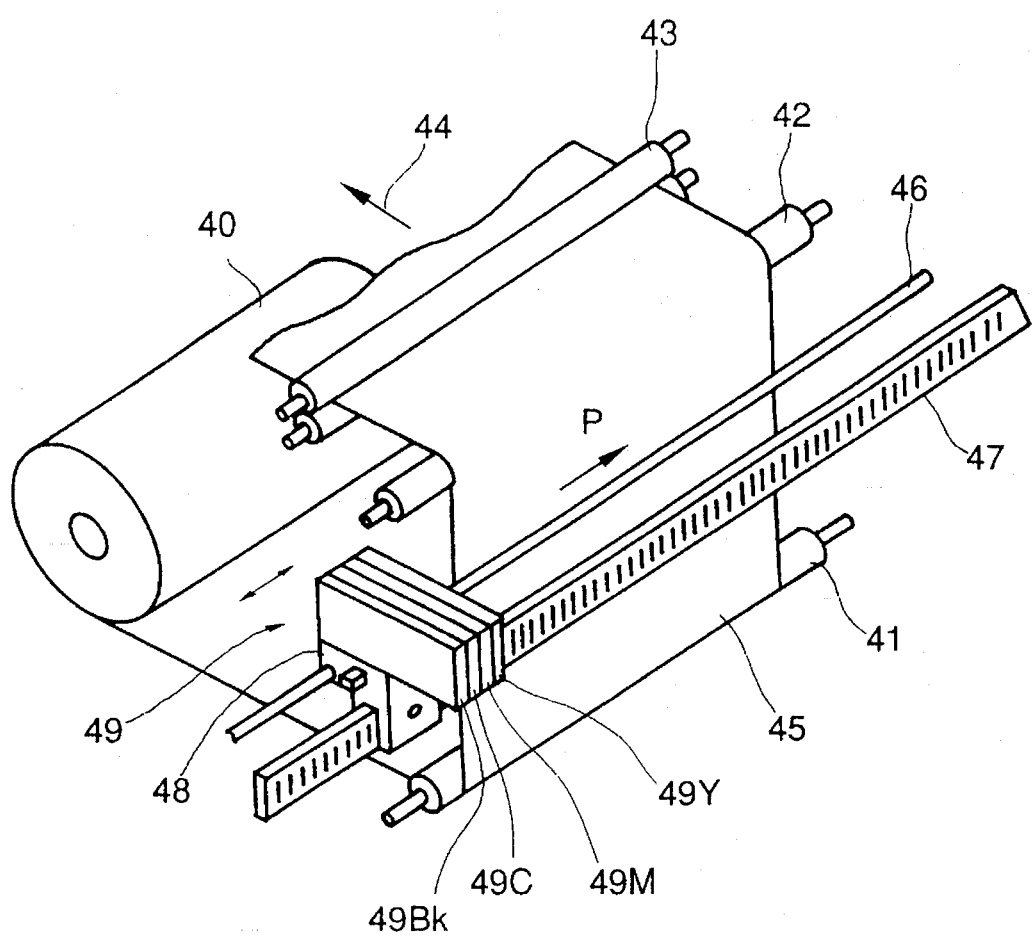
FIG. 2 is a perspective view illustrating an ink jet recording apparatus to which the present invention is applicable.

FIG. 2 is a perspective view illustrating a color ink jet recording and image formation apparatus to which the above-mentioned method is applied. In FIG. 2, a recording medium 40 wound like a roll is held between sheet rollers 43 through feed rollers 41 and 42, and with the rotations of these rollers, the recording medium is carried in the direction indicated by an arrow at 44. Across this recording medium 45, guide rails 46 and 47 are placed in parallel to enable a recording head unit 49 mounted on a carriage 48 to scan right and left. Meanwhile, for the guide rail 47, slits are provided, and it is made possible for the carriage 48 to recognize the carriage position and others by detecting the slits with a photosensor arranged on the carriage 48. On the carriage, there are mounted four heads 49Y, 49M, 49C and 49Bk for each different colors of yellow, magenta, cyan, and black. Ink tanks are also arranged for these four colors. Each head is of a multinozzle type having 128 discharging ports (400 DPI:φ=a hole diameter equipment to 24 μm). The recording medium 45 is fed intermittently for the printing width (equivalent to 8.128 mm) of the recording head 49. While the recording medium 45 is at rest, the recording head 49 scans in the direction P to eject ink droplets in accordance with the image signals (maximum driving frequency: 4 KHz; ink ejection amount: approximately 30 ng/dot).

Figure 3:
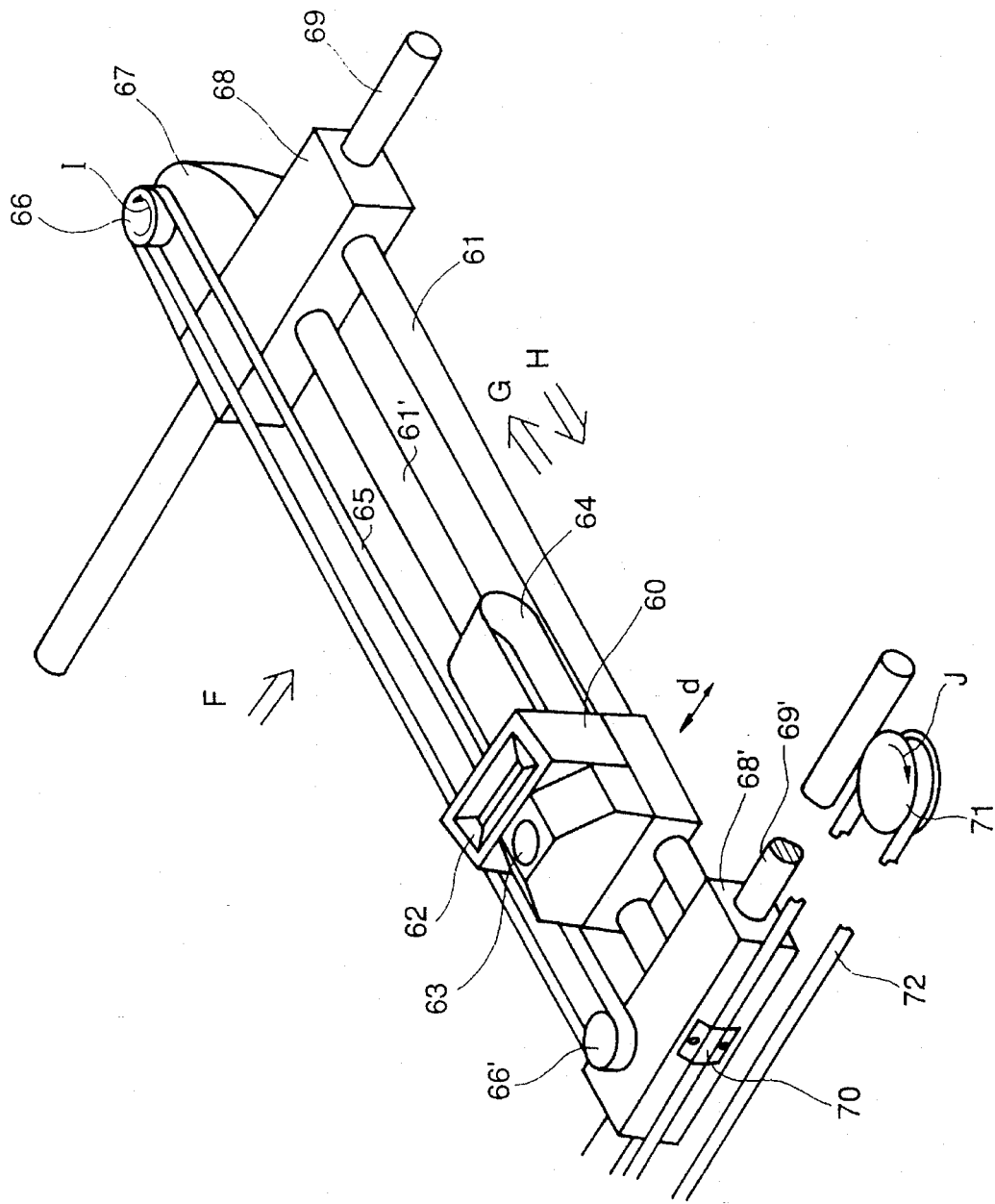
FIG. 3 is a perspective view illustrating a reading unit.

FIG. 3 is a perspective view illustrating the structure of a reading unit and scanning mechanism therefor. Above a reading unit 60, a transparent glass base for originals is arranged, and an original 2 is set thereon with its printing face downward. Thus, the structure is made to allow the reading unit 60 to read the information written on the original from the below. In FIG. 3, the reading unit 60 slides on a pair of guide rails 61 and 61' to read the image. The reading unit 60 comprises a light source 62 for illuminating the original and a lens 63 and others to image the original image upon photoelectric conversion elements such as CCD. A reference numeral 64 designates a flexible lead wire flux to supply power to the light source 62 and the CCD and transmit the image signals from the CCD as well as other control signals. The reading unit 60 is fixed to a driving force transmitting portion 65 composed of a wire and others for main scanning in the direction (G and H directions) intersecting the carrying direction of the recording medium. The driving force transmitting portion 65 is tensioned between pulleys 66 and 66' in the main scanning direction to enable the reading unit to read the line information of the image running straight in the main scanning direction G by the bit number which corresponds to the CCD. When a given width of the image has been read, a main scanning pulse motor 67 is rotated in the direction opposite to the direction indicated by an arrow I. By this, the reading unit 60 is carried in the direction H to return to the initial position.

In this respect, reference numerals 68 and 68' designate carriages which slide on the guide rails 69 and 69' for the sub-scanning direction (F) which are substantially orthogonal to the main scanning direction G. The carriage 68' is fixed by a fixing member 70 to a driving force transmitting portion 72 composed of a wire tensioned between pulleys 71 and 71' (not shown) and others for the sub-scanning in the (F) direction. When the main scanning is completed, the pulley 71 is rotated in the direction indicated by an arrow H by a pulse motor, servo motor, or some other sub-scanning driving source (not shown) for a movement of a given distance (the same distance d as the image reading width in the main scanning direction G) to allow the carriages 68 and 68' to conduct sub-scanning in the direction indicated by the arrow F and then the rotation of the pulley is suspended. Here, again, the main scanning G is started. It is thus possible to read the total area of the original image by repetitions of this main scanning G, the returning movement H in the main scanning direction, and the sub-scanning F. In this respect, it may be possible to conduct the sub-scanning feed of an original instead of the sub-scanning operation of the reading unit.

Here, the description will be made of an aspect related to the correction of density unevenness according to the present invention. At first, the density streaks generated in a low density area will be described in detail.

Figure 4:
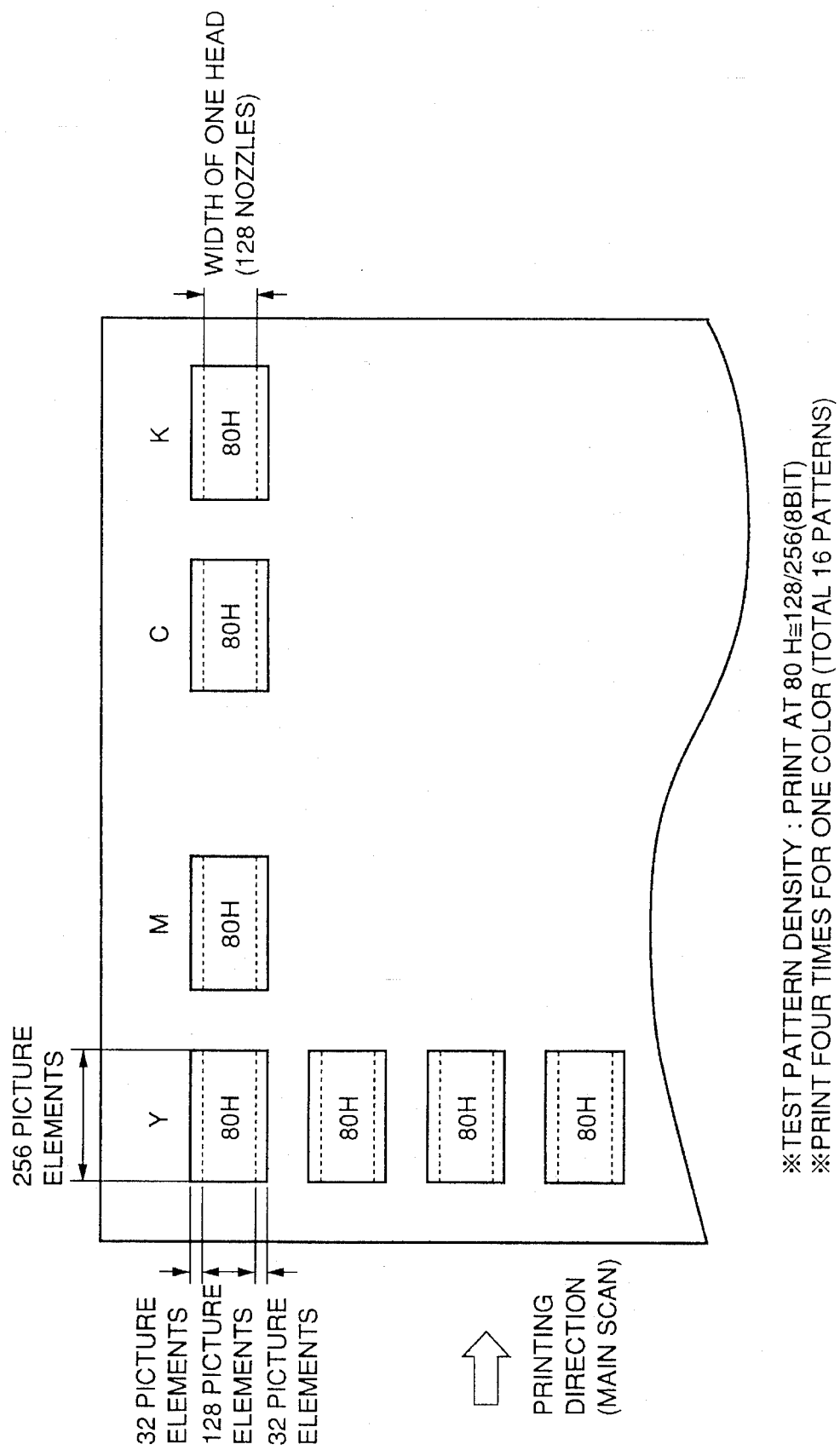
FIG. 4 is a view showing a test pattern used for the present invention.
Figure 5:
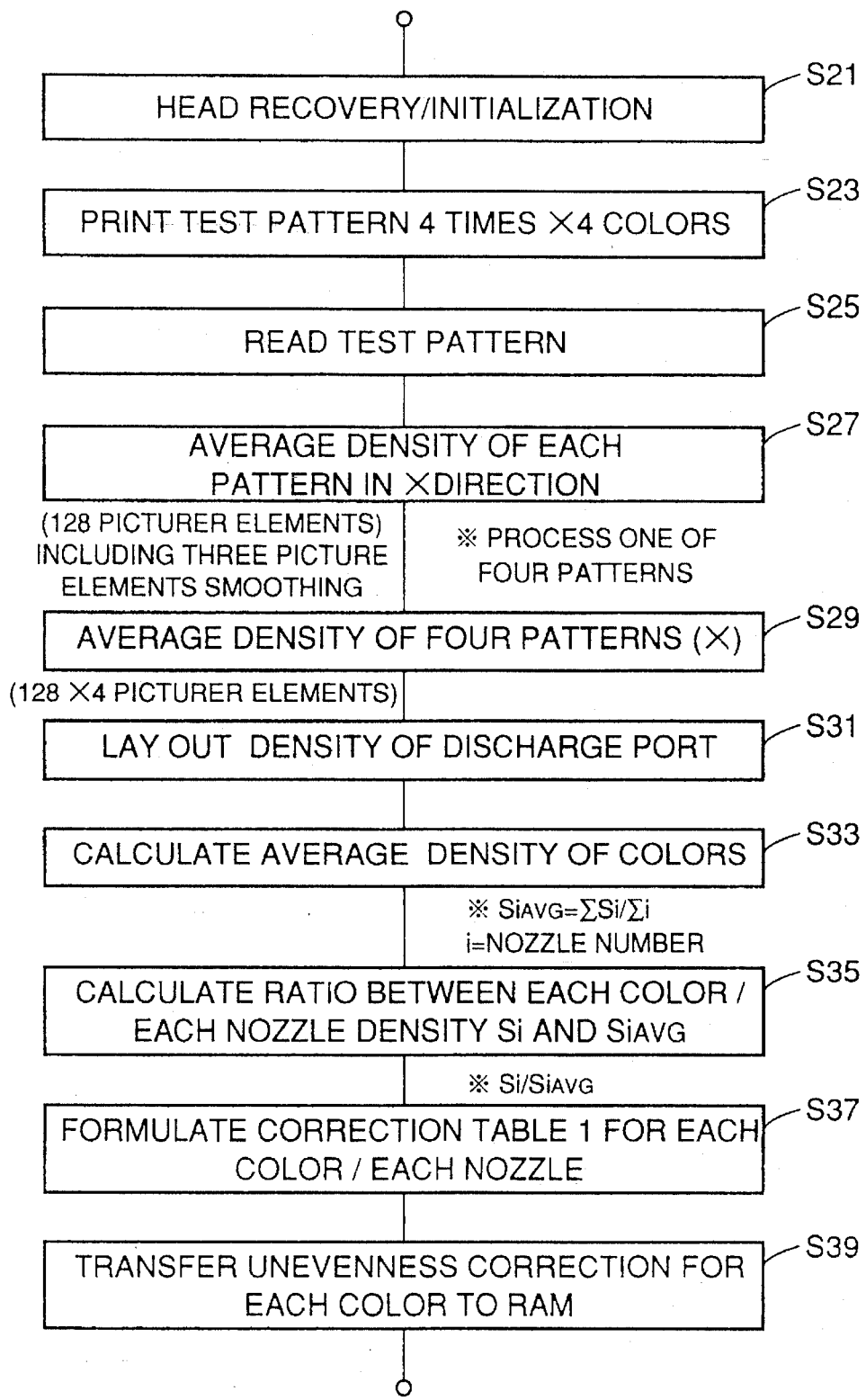
FIG. 5 is a diagram showing a correction sequence according to the present invention.
Figure 7A:
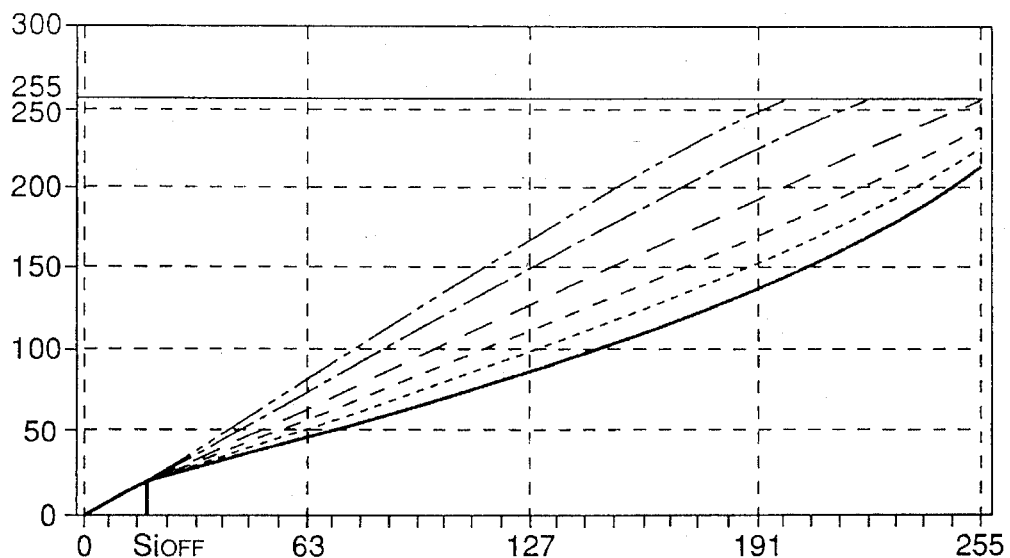
FIGS. 7A and 7B are views showing a correction table 2 according to the present invention.

In a conventional method for correcting density unevenness, only the pattern of fixed density signals (printing ratio being density data=80H: approximately 50% DUTY) is printed as shown in FIG. 4 (as described later in detail) to estimate the distribution of ejected amount of the head for each color known on the analogy of its density. Then, in accordance with the correction sequence as shown in FIG. 5, operations are executed to produce the correction table 1: HS table which is represented in FIG. 6. Thus, in accordance with this HS table, the correction curve in the correction table 2: HS_γ curves as shown in FIG. 7A (correction curve: linear curve) corresponding to the image signals (8 bit signal:FF (hex)=256 (dec)) is selected for each nozzle for correcting the image signals.

Figure 8A:
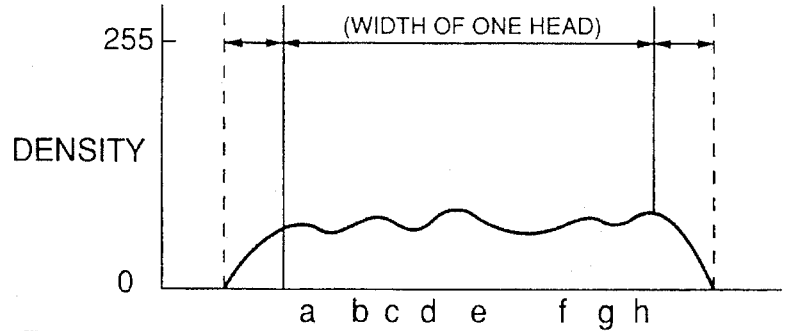
FIGS. 8A to 8D are views showing the density distribution for each of the densities.
Figure 8B:
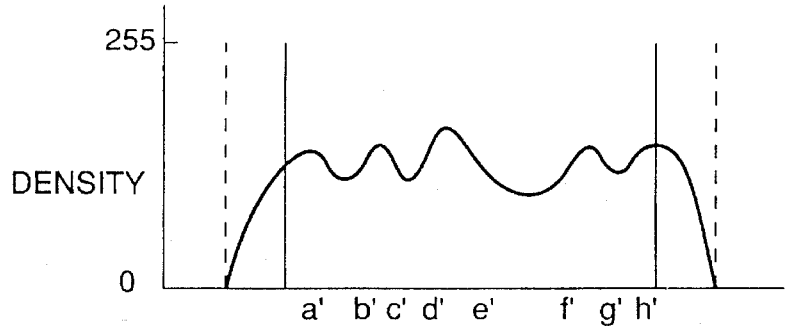
Figure 8C:
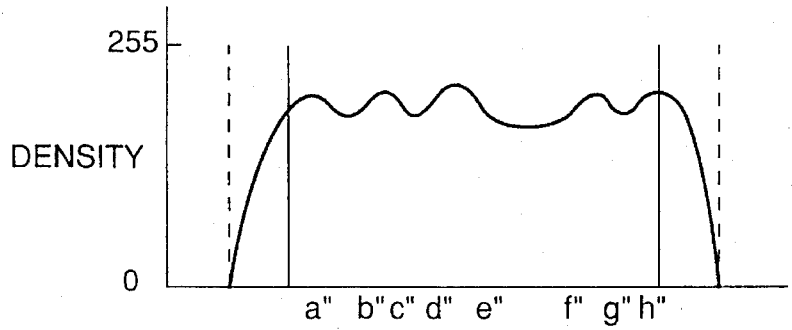
Figure 8D:
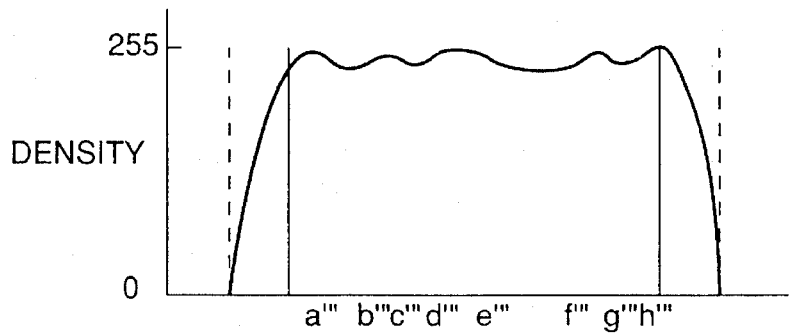
Figure 9A:
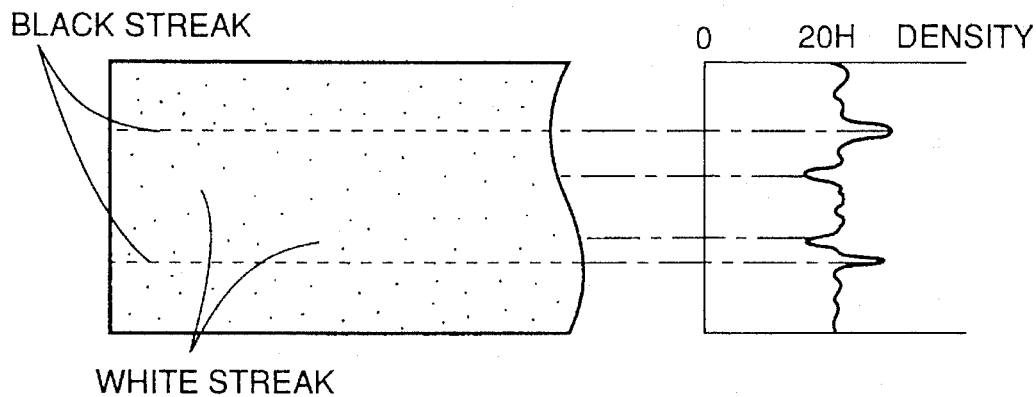
FIGS. 9A and 9B are views showing the states of density unevenness in a low density.

Meanwhile, the ratio of the density unevenness for each density (DUTY) differs due to the variations of the ratio between the dots formed by ink according to the density signals and the white portion of the recording agent. In general, dots are scattered in a low density. Therefore, as shown in FIG. 8A, the density unevenness is not conspicuous. Also, in a high density, the dots overlap each other greatly to make the density maximal so that the density unevenness is not conspicuous as shown in FIGS. 8C and 8D. At this juncture, if the correction table 1 (FIG. 6) produced as density data for correcting unevenness in an intermediate density (80H) is used for printing with a low density signal (a density signal of approximately 20H or less as density data, for example) by selecting a table having a large correction amount (for example, ±30%), 10 the resultant correction will be too great. In other words, there occurs thinning of data corresponding to the correction table 1 (corresponding to the smaller table number: a) or thickening of data (corresponding to the larger table number: b), and the portion where the data are thinned represent white streaks while the portion where the data are thickened represent black streaks. The corrections of the density unevenness thus attempted result in the generation of streaks on the contrary. This state is illustrated in FIG. 9A.

Furthermore, in an actual printing, the density data (8 bit signals) are binary coded into the driving signals (one bit signals). As a binarization technique, an error diffusion method, mean density preservation method, or the like is adoptable. In any case, however, if density signals (non-ejection) which do not satisfy threshold values are continuously given, the threshold values are lowered relatively; thus making it easier thereafter to conduct ejections when a comparatively high density signal is inputted. As a result, if a low density signal (a density signal of approximately 20H or less as density data, for example) with a number of nozzles in service being small and scattered is used for printing with the selection of a table having a large correction amount (±30%, for example), there take place the nozzles which are often used for printing and those which are scarcely used; hence resulting in the state shown in the above-mentioned FIG. 9A more conspicuously.

Figure 9B:
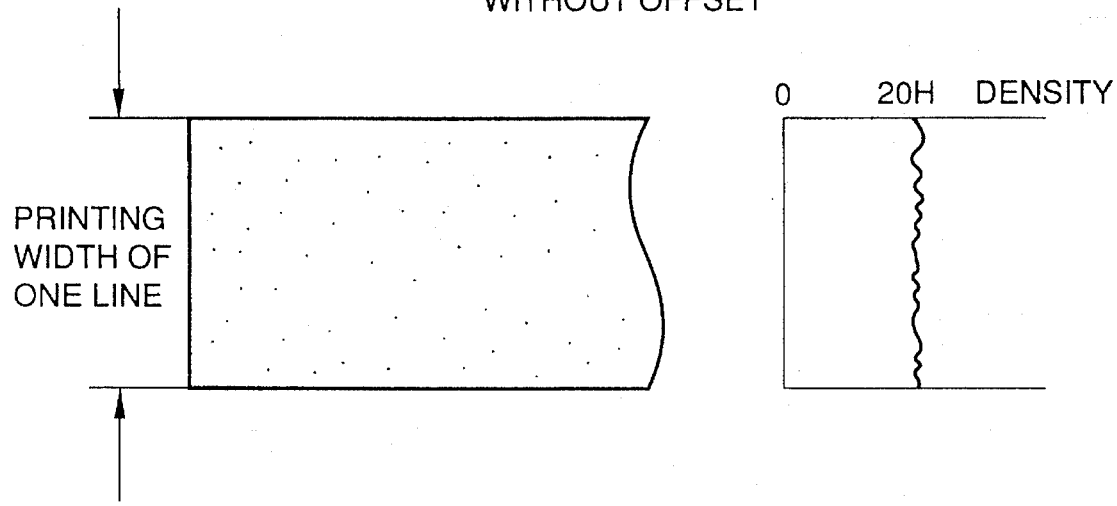

According to the present invention, therefore, the correction of density unevenness is offset (in practice, density signals being made through and output without any conversions by the table 2 for correcting density unevenness) so as not to conduct any correction for the density unevenness when the density signal is lower than a certain level. This state is represented in FIG. 9B. Here, in FIG. 9B, this offset SiOFF for density unevenness is made 20 (dec). This value is not necessarily confined thereto because it is variable depending on the resolution of the head, recording agent (particularly, the bleeding factor of ink), ink components, and the like. The value may be set so that the generations of the respective density streaks will not be conspicuous.

Figure 10:
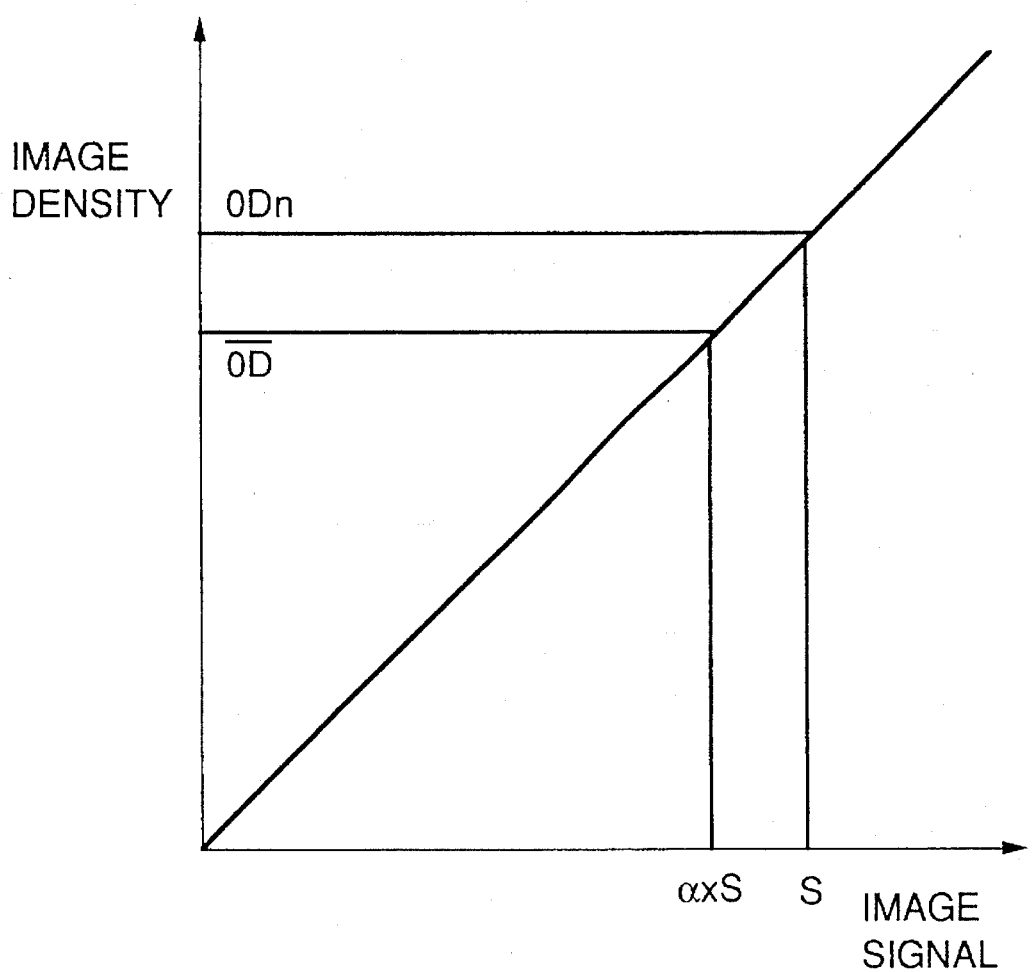
FIG. 10 and FIG. 11 are views for explaining the modes in which to correct unevenness for a recording head.

Now, the detailed description will be made of the correction algorithm employed in the present embodiment. The purpose of the correction is to converge the results of printing output of the respective nozzles to a mean density value. For simplification, the description will be made of a case where the number of recording nozzles is N. When each of the elements, that is, nozzles (l to N), is driven to perform printing with a certain uniform image signal Si, a density distribution is assumed to have taken place in the direction of the nozzles of this head. At first, the densities OD1 to ODN of the portions corresponding to each of the recording elements are measured to obtain a mean density, OD AVG= ΣOD AVG/N. This mean density may be obtainable by the application of a method for obtaining a mean value by integrating the amounts of reflecting rays of light or of other methods known, not necessarily on the basis of each of the elements. If the relation between the value of the image signal and the output density of a certain element or a certain element group is as shown in FIG. 10, the signal actually given to this element or this element group can be arranged by defining the correction coefficient α, which will bring about the objective density OD AVG, with correction of the signal Si. In other words, the correction signal Si, which is arranged by correcting the signal Si to α×Si=(OD AVG/ODN)×Si, should only be given to this element or this element group in accordance with the inputted signal Si. More specifically, the execution is performed by providing the table conversion as shown in FIG. 11 for the inputted image signal.

Figure 11:
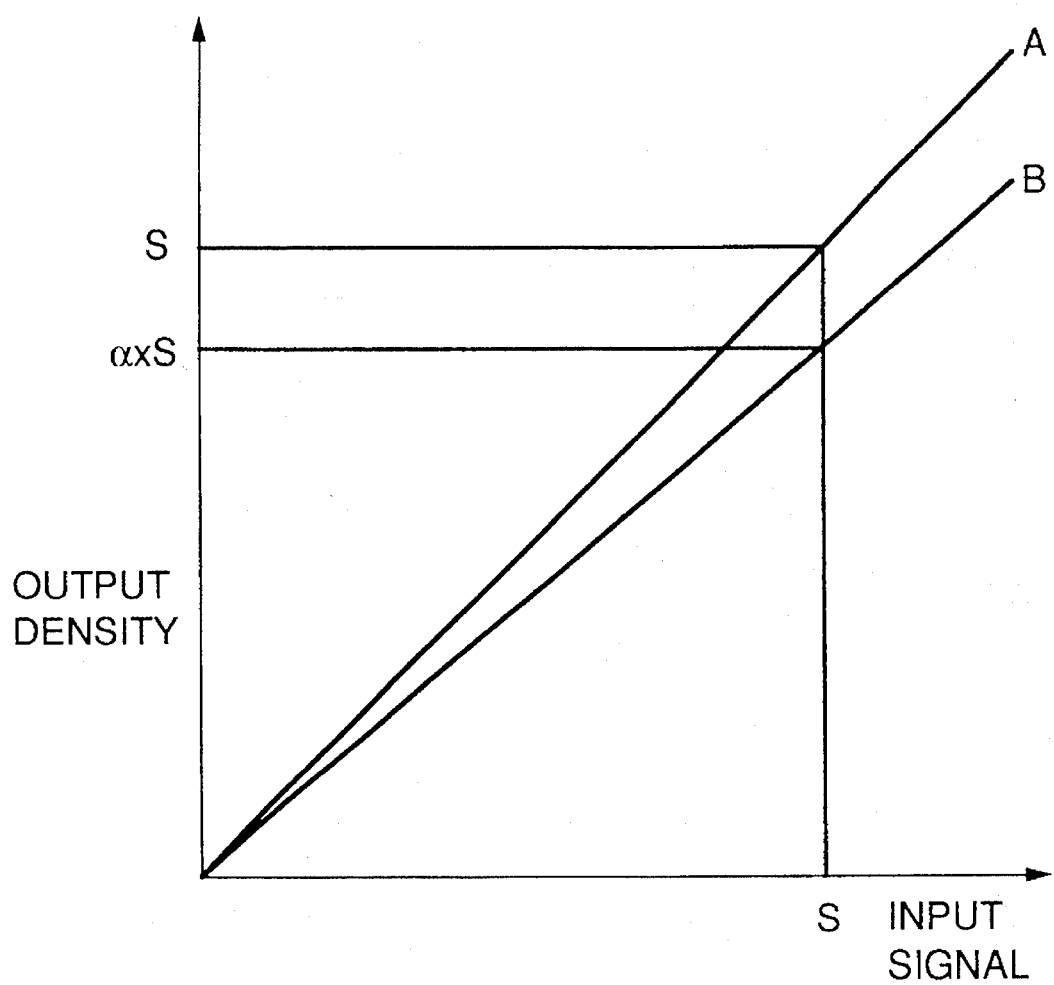

In FIG. 11, the straight line A is a straight line having an inclination 1 which is a table for outputting the inputted signal as it is without any conversions at all. The straight line B is a straight line having an inclination of α=OD AVG/ODN, which is a table for converting the inputted signal Si to the output signal α·Si. Therefore, if a printing is performed after having given the table conversion which determines the correction coefficient αN for each of the tables such as represented by the straight line B in FIG. 11 with respect to the image signal corresponding Nth recording element, each of the densities of the portion recorded by an N number of recording elements becomes equal to the OD AVG. If a process of the kind is given to all the recording elements, density unevennesses are corrected and even images can be obtained. In other words, if the data can be obtained in advance whereby to make known the kind of the table conversion given to an image signal with respect to a particular recording element, it becomes possible to correct density unevenness.

Figure 12:
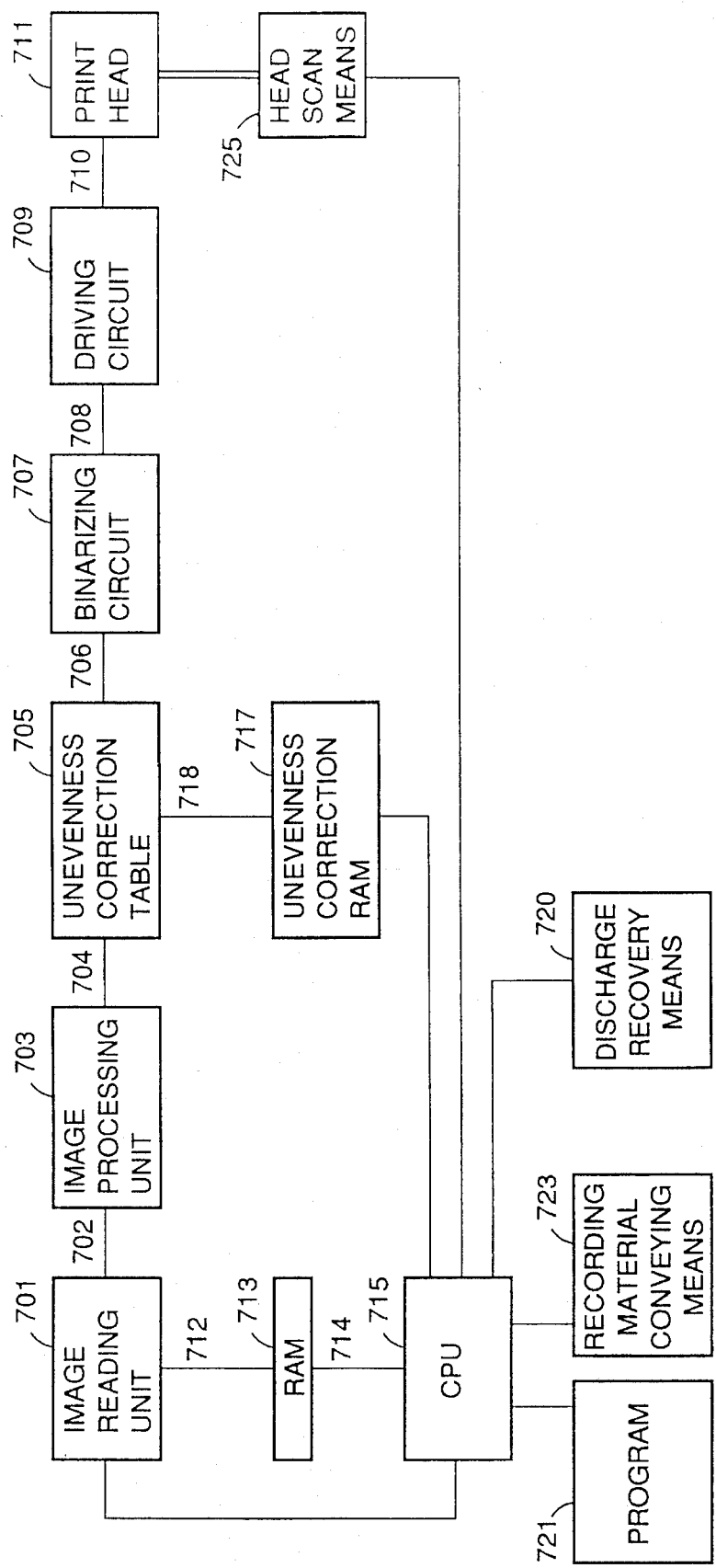
FIG. 12 is a block diagram showing the structure of a control system according to the present invention.

FIG. 12 is view showing an example of the structural flow of a printing control system according to the above-mentioned structure, in which a reference numeral 701 designates a reading unit having the above-mentioned reading carriage 60; 702, image data (R/G/B) output by the reading carriage 60; 703, an image processing unit for conducting processes in a logarithmic conversion circuit for converting illuminance signals to density signals, a masking circuit for executing chromatic processing, a UCR circuit, a color balance adjusting circuit, and others; 704, image signals (C/M/Y/Bk) subsequent to the image processing; 705, a ROM in which a correction conversion table is stored; 706, image signals after the correction of unevenness; 707, a binarizing circuit; 708, image signals after the binarization; 709, a head driving circuit; and 710, head driving signals. A reference numeral 711 designates recording heads representing the heads 1Y to 1Bk shown in FIG. 2; 712, signals to read unevenness; 713, a RAM for holding such signals; 715, a CPU for controlling each unit; 716 and 718, unevenness correction signals; 717, unevenness correction RAM; also 720, recovery means for maintaining the ejecting state of the recording heads 711 desirably by conducting suction and others; 721, a ROM for storing the correction program which will be described using FIG. 13; 723, means for carrying the recording medium 45; and 725, means for enabling the recording head to scan over the recording medium.

In FIG. 12, the image signals 704 after image processing in the image processing unit 703 are converted into those correcting the unevenness for the recording head by means of the unevenness correction table ROM 705 (correction table 2). This unevenness correction table ROM 705 has 64 correction curves (linear correction: straight lines) and serves to switch over the correction curves in accordance with the unevenness correction signals 718. FIG. 14 is a view showing one example of the unevenness correction table 2. In the present embodiment, there are provided 64 correction straight lines having different inclinations each by 0.01 from Y=0.68X to Y=1.31X, and the correction straight lines are switched over in accordance with the unevenness correction signals 718. For example, when a signal of the picture element to be recorded at a discharging port having a large amount of ejection (the resultant dot diameter becoming large on a recording medium) is inputted, the correction straight line of a small inclination will be selected. On the contrary, when the discharging port having a small amount of ejection (the resultant dot diameter being small) is used, the correction straight line of a large inclination is selected. In this way, the image signals are corrected. Hence, the density unevenness distribution within a certain 10 area is corrected. At this juncture, the density unevenness offset is given with respect to the density unevenness correction. If, therefore, an inputted signal is lower than the SiOFF (20 (dec)), only one straight line of Y=1.0X is used so as not allow the correction curves to be switched over for the unevenness correction signals 718.

Figure 14A:
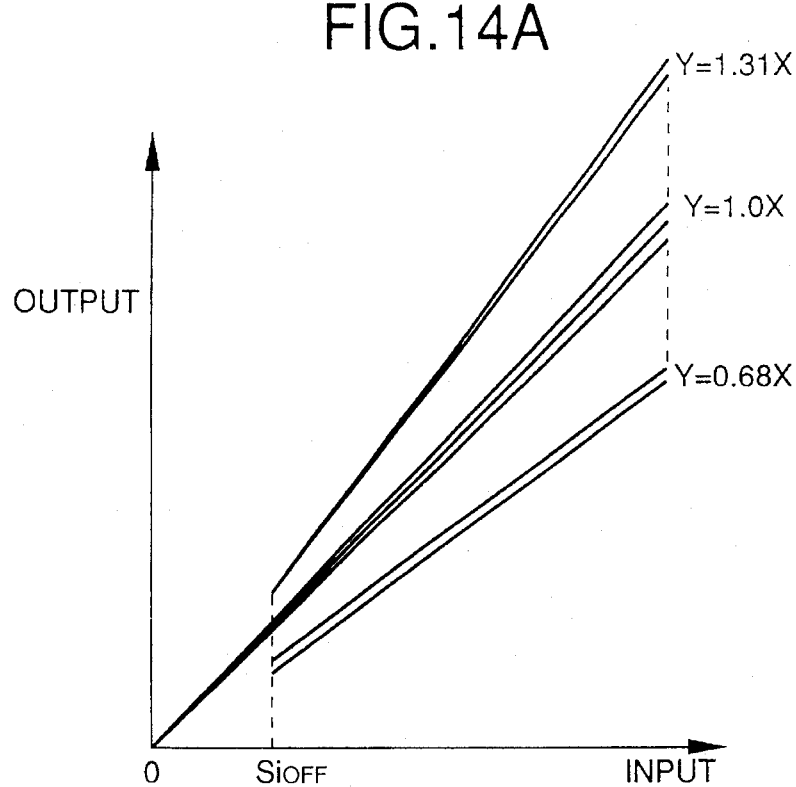
FIGS. 14A and 14B are views for explaining the correction table 2 according to the present invention.
Figure 14B:
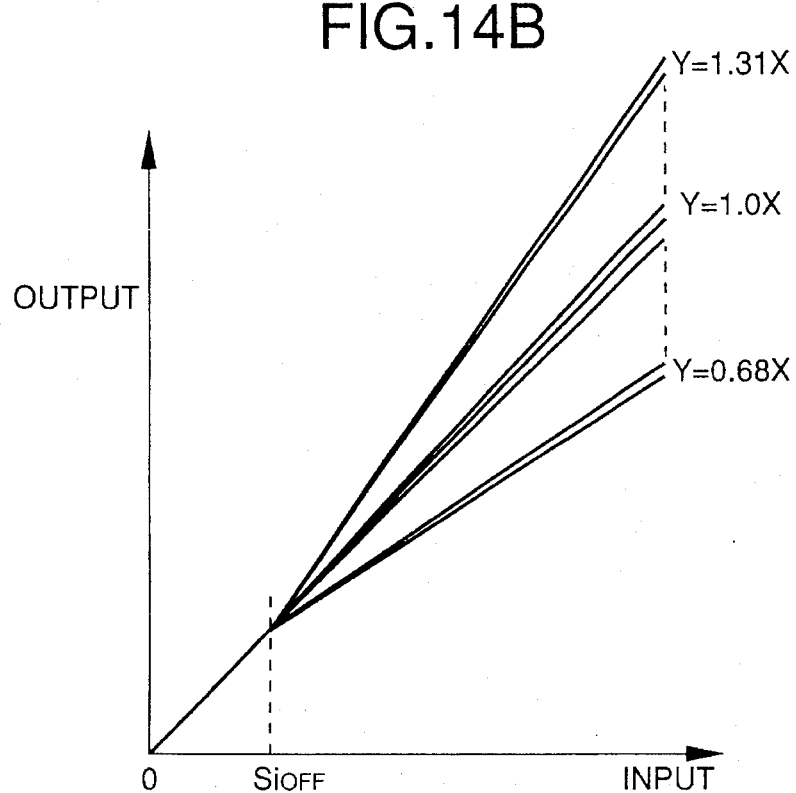

The correction table 2 shown in FIG. 14A is such that the correction straight line is defined to be only one as Y=1.0X when an input signal is of zero to SiOFF in the correction table 2 (reference: FIG. 11) which is conventionally in use. It is therefore possible to produce this correction table with ease on the basis of the correction table 2 conventionally used. On the other hand, the correction table 2 shown in FIG. 14B has 64 correction straight lines beginning with the input signal at the point SiOFF and thus there are no disconnecting points in the correction straight lines. As a result, no false tonality is generated in the vicinity of the point at which the input signal is SiOFF. Hence, there is no possibility that the image quality is degraded.

The unevenness correction RAM 717 shown in FIG. 12 (correction table 1) stores the selection signals for the correction straight lines required for the unevenness correction for the respective heads. In other words, it stores the unevenness correction signal having 64 different values from 0 to 63 for each of the discharging ports of the recording heads, and outputs the unevenness correction signals 718 in synchronism with the image signals inputted. Then, the signals 706, the unevennesses of which have been corrected by the correction straight lines selected by the unevenness correction signals, are binarized by the binarizing circuit 707 using dither method, error diffusion method, or the like. Hence, color images are formed without any density unevenness when the heads 711 are driven through the head drivers 709. It may also be possible to incorporate a system of the above-mentioned correction method as a main body sequence so that the user can simply correct the density unevenness in a case where the fluctuations of density unevenness occurs due to a long-time use or the replacement of the heads.

Now, regarding this sequence, the detailed description will be given below. FIG. 13 is a flowchart showing an example of the procedures for unevenness correction processes according to the present embodiment. When the procedures are started by depressing a correction key for density unevenness (not shown), the ejection stability for the recording heads is secured by the recovery and initialization of the heads in step S1 at first. This is needed because if any density unevenness correction process is performed for the recording heads which are not in normal conditions due to the increased viscosity of ink or mixture of dusts and bubbles, there is a possibility that the head characteristics (distributional state of density unevennesses) cannot be recognized with fidelity. At this juncture, the recovery can be performed under conditions optimized in consideration of the state of use, environmental condition and many others. The known recovery techniques (suction, air blast, temperature adjustment, driving, and the like) may be combined for the purpose. In this respect, it may be possible to effect warming up printing at the time of the test pattern printing or reading a stabilized area in addition to the above-mentioned technique.

Figure 15:
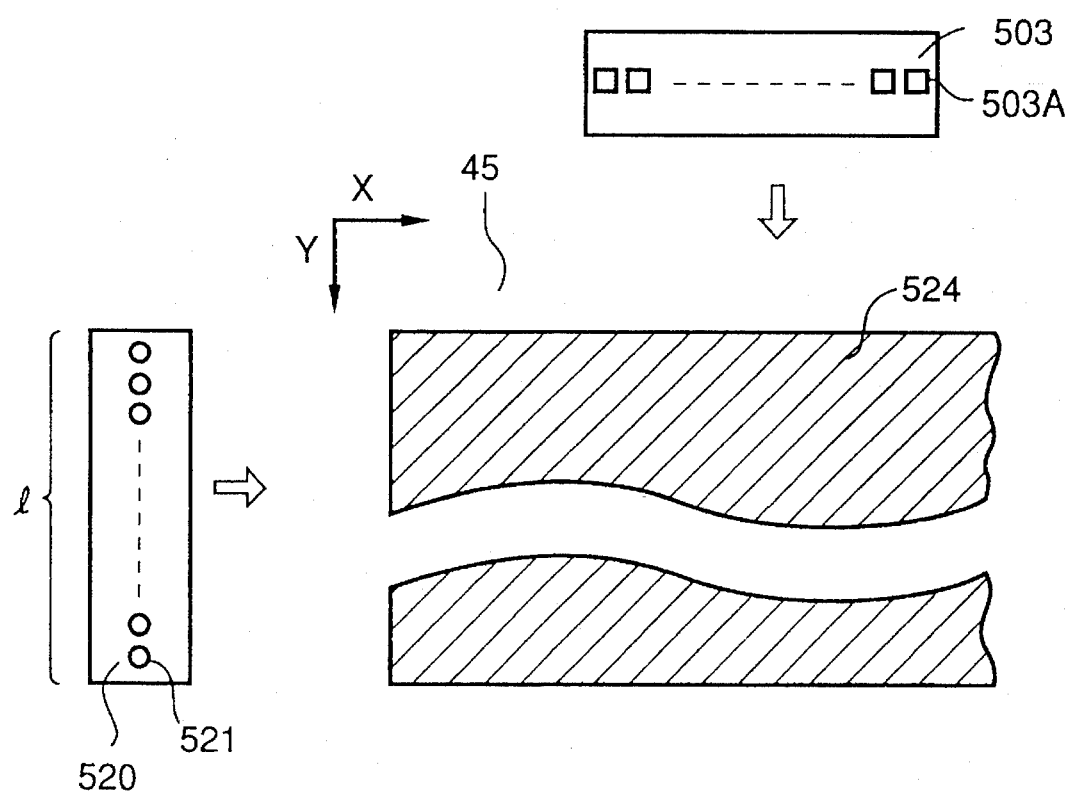
FIG. 15 is a view for explaining a method for forming a test pattern and reading such a pattern.
Figure 16:
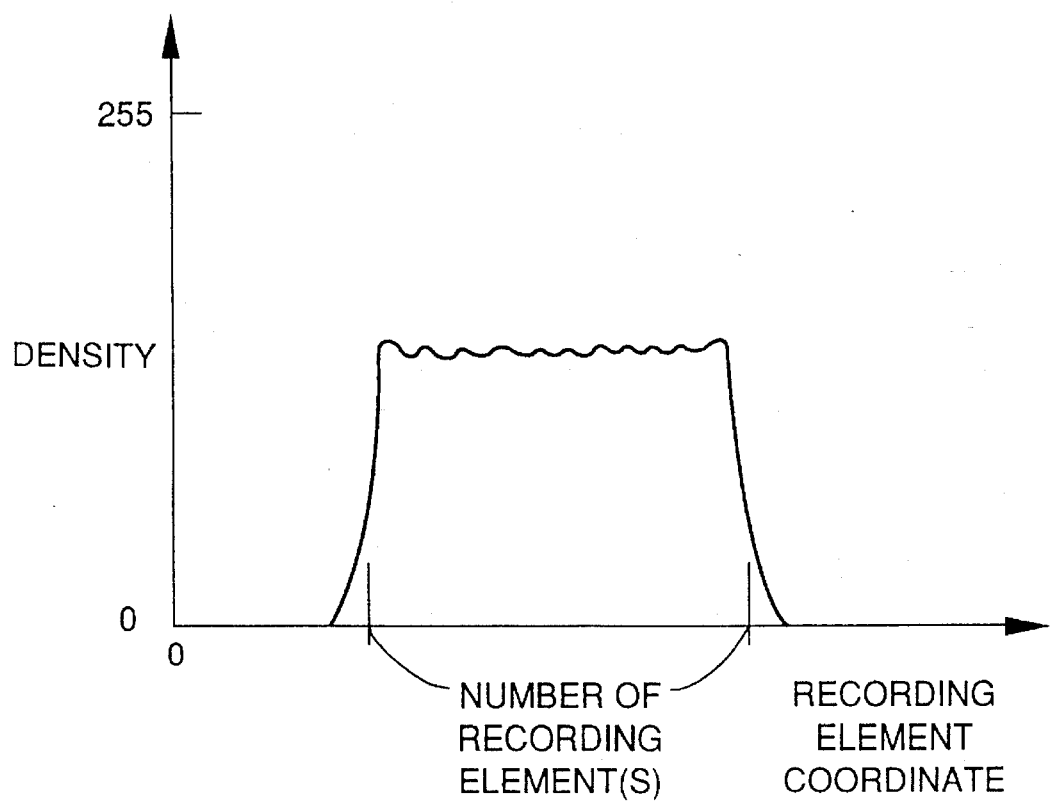
FIG. 16 is a view showing the density distribution after reading the density of the test pattern.

Subsequently, in steps S3 and S5, the test pattern is printed and read, respectively. In the present embodiment, a plurality of density unevenness patterns as shown in FIG. 4 are read according to the method, which will be shown in FIG. 15, and the results of the density distribution thus calculated become as shown in FIG. 16. Here, the axis of abscissa is the direction Y, that is, the arranging direction of the discharging ports of the recording heads while the axis of ordinate represents the average of the densities read in the direction X within the region of the reading element arrangement. Thus, the density distribution does not show its leading edges clearly at both ends of the printing area in view of the reading unit; hence making it difficult to make the density correction at both ends in some cases. Here, therefore, by employing an irregular three-line printing to give consideration to the leading edge portions at both ends, the solution is made possible.

Figure 17:
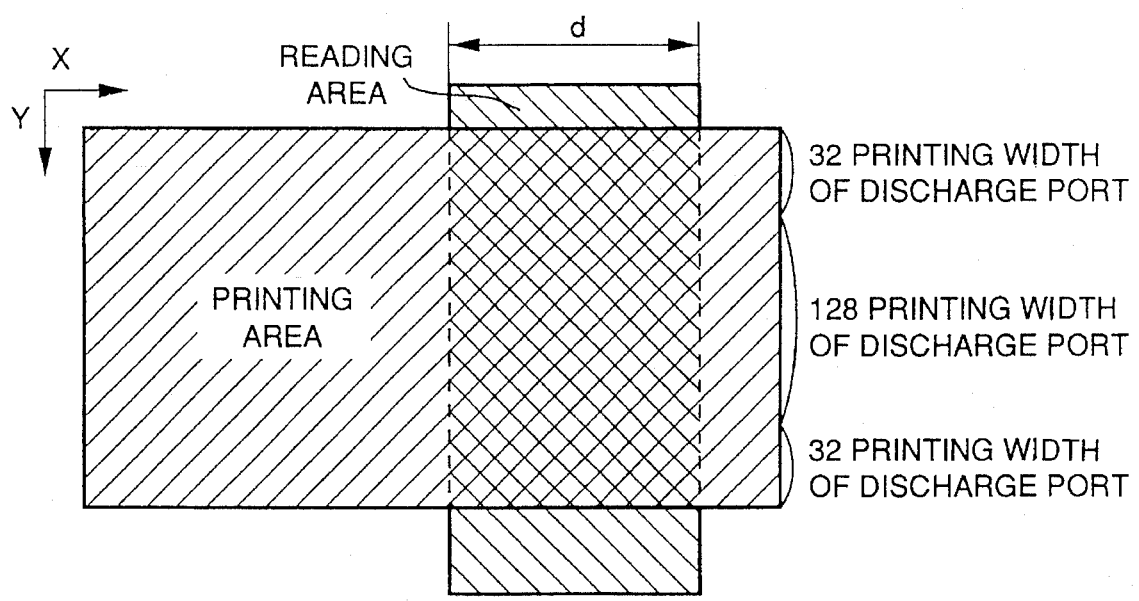
FIG. 17 is a view for explaining a test pattern by an irregular three-line printing.
Figure 18:
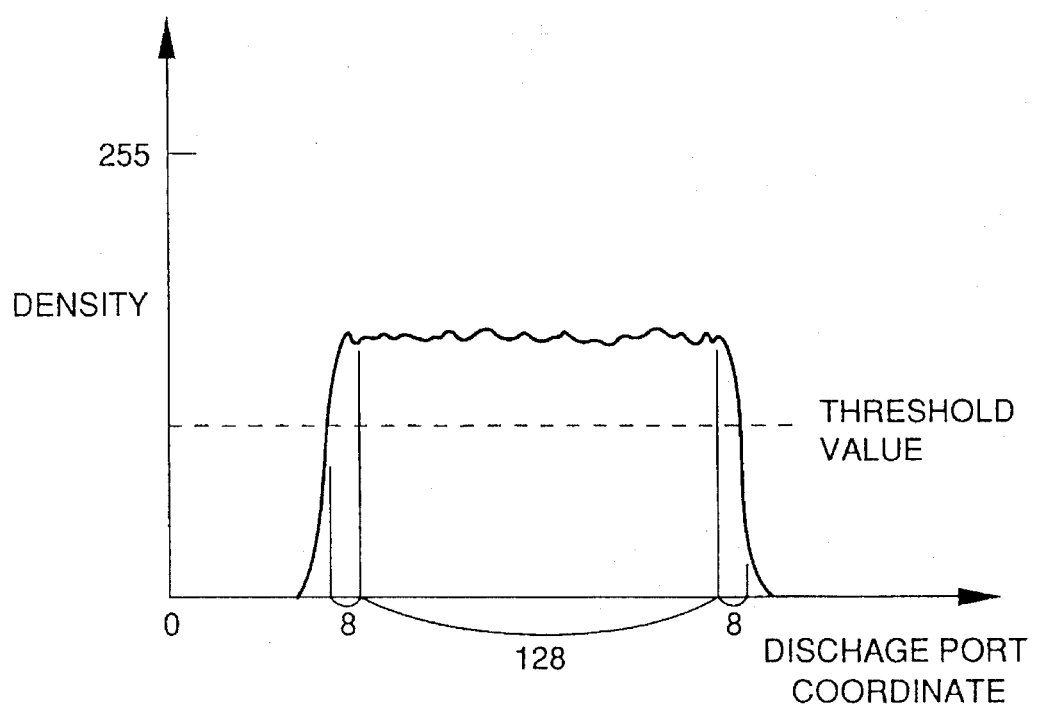
FIG. 18 is a view showing the density distribution in the test pattern.

Now, in conjunction with FIG. 17 and FIG. 18, the irregular three-line printing will be described. In FIG. 17, a reference mark X designates the scanning direction of the recording head and Y, the direction of the picture elements (nozzles) of the recording head, that is, the arranging direction of 128 discharging ports. As a printing method, the printing is performed on the first line using the 97th to 128th nozzles (discharge ports) at first and then, on the second line, the printing is performed using the entire nozzles, and lastly, on the third line, the printing is performed using the first to 32nd nozzles. The area surrounded by dotted lines is an area where the test image is read by use of the reading unit. In the present embodiment, 128 picture elements are used. On the left side thereof, a printing warm up area is provided. Here, 32 nozzles in front and behind are used. The purpose is to implement the required steps to observe the leading edges for reading. (In order to match the data on density unevenness with the nozzle positions, the edges must be detected to perform an accurate reading.)

Now, using FIG. 18, this method will be described. At first, the total density distribution is fetched and the threshold value is predetermined so that the portion where the printing is being performed such as indicated by a broken line in FIG. 18 and the other portions (that is, white sheet portion) can be distinguished clearly. Then, the number of the nozzle having the density higher than the threshold value is found by computation, and a position corresponding to a nozzle retraced 64 therefrom is assigned to the first nozzle. Thus, the second, third, . . . , and 128th nozzle are assigned sequentially. In this way, it becomes possible to obtain the density distributions of nozzles accurately.

However, although the number of nozzles used on both ends at the time of performing the irregular three-line printing is not necessarily limited to this number because such a number is dependent on the capability of a reading unit, a control must be provided so as to perform the printing in the same state as the entire nozzles being used for printing in terms of the driving conditions, temperature adjustments, and the like.

The data thus read are tentatively stored in the RAM as data on picture elements of 32+128+32 and then restored to the data on 128 picture elements required as density unevenness for the head in order to execute the foregoing unevenness correction processing. At this juncture, as means for enhancing the picture element reading accuracy, weights are given between the picture elements when positioning them in the nozzle direction of the head or the density data may be produced for each of the picture elements while giving smoothing treatments. In the present embodiment, the data, $Si'=(Si-1+Si+Si+1)/3$, which is obtained by averaging the respective density data on both sides facing the nozzle arrangement direction of an objective picture element, is employed. Also, when the kinds of recording medium or ink are changed, these conditions should only be optimized. There is no need to change the methods of the data processing, threshold values, and the like.

Now, when a recording head capable of performing multi-print is used, the multi-print recording head is arranged to structure one picture element with a plurality of dots at the time of 10 executing its density test printing of a test pattern or the like. Thus, the variation of the printing (tonal) density is modulated by increasing or decreasing the number of recording dots which constitute such a density. In this case, too, the present invention set forth above is effectively applicable as a further application to another mode. Further, by the combination of the ejecting amount control or other printing control, the corrections can be made more accurately. It is thus ascertained that the pictorial images are beautifully formed without any density unevennesses and density streaks in the entire density areas having low to high densities if the density unevenness offset is adopted.

(Embodiment 2)

Figure 7B:
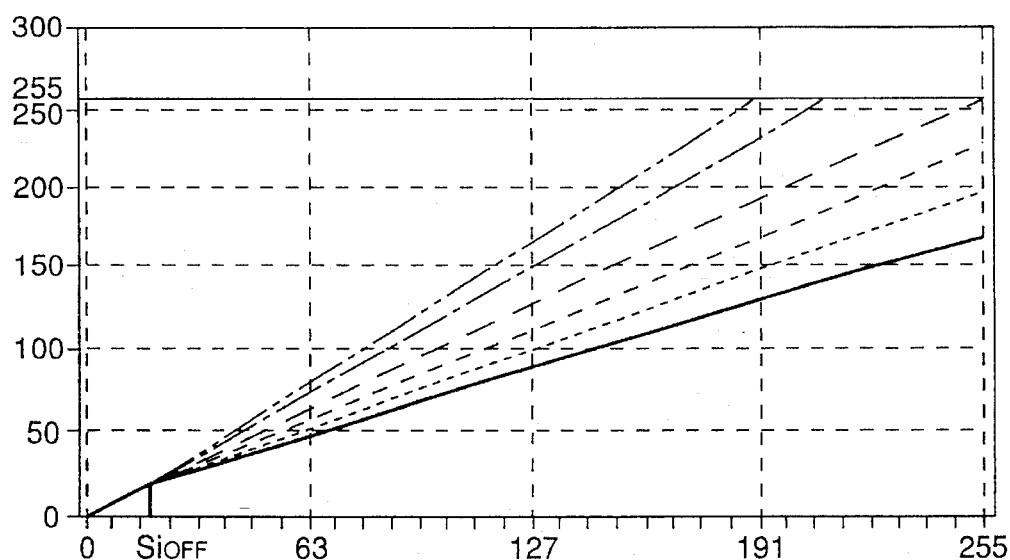

FIG. 7A is a view showing a second embodiment according to the present invention in which the present invention is applied to a digital color copying apparatus. FIG. 7B is a view showing a linear correction table which is the same as the correction table 2 described earlier in conjunction with FIG. 14B.

In the present embodiment, for the purpose of executing the density unevenness corrections more accurately in the areas of the low to high densities, the correction table 2 (HS_$\gamma$ curves) is rearranged from the linear type to nonlinear type as well as the correction amounts of the density unevenness are modified in accordance with the inputted density signals and at the same time, the above-mentioned density unevenness offset is additionally provided.

The correction table 2 is now of the nonlinear type and the correction amounts are changed in accordance with the density signals by estimating the unevennesses of the ejection amounts of the head corresponding to the density signals. (As described above, the ratio between the dots formed by ink and the white portion of the recording agent is varied by the density signals and thus the ratio of the density unevenness is different according to the respective densities (DUTY): refer to FIGS. 8A, 8B, 8C, and 8D.) Therefore, the structure is arranged to enable the correction of the density unevenness for the head in the entire tonal representations from the low to high densities using both corrections in accordance with the correction table 1 and correction table 2:HS_$\gamma$ curves (correction curves: nonlinear).

Here, a method for producing the correction table 2:HS_$\gamma$ table (non-linear) used for the present embodiment will be described briefly. Firstly, 17 density patterns: jth (00H/10H/20H/30H/40H/50H/60H/70H/80H/90H/A0H/B0H/C0H/D0H/E0H/F0H/FFH) are printed and each of the densities are read to obtain the average value of the respective densities Sij AVG or the standard deviation $\sigma$ij. Then, the ratio to the average density data on the 80H, Si 80HAVG, that is, Sij AVG/Si 80HAVG, is calculated. To these data, high order approximations are given (more than degree four preferable) to fit the correction amount for each of the densities. Then, the ratio of the correction amount for the 80H in each of the densities is determined; hence defining this correction amount at 80H as 1.0 to determine the ratio again with each of the densities, and the correction table 2 is used in the same manner as described earlier by producing a table having 64 pieces, 0 to 63.

In the present embodiment, while the correction amount is determined using the average density, it may be possible to determine correction amounts using the standard deviation $\sigma$ which represents density unevenness. In this respect, the amount of density unevenness offset is defined as 20 (dec) as in the embodiment 1. As regards the method for producing the correction table 1: HS table, the detailed description has already been made in relation to the previous embodiment. Any repetition thereof will be omitted here. With the combination of the density unevenness offset and the non-linear correction curves for the use of the unevenness correction in the color copying apparatus, it is ascertained that pictorial images are beautifully formed without any density unevenness and density streaks in the entire density areas of the low to high densities.

Here, in the above-mentioned embodiment, while no correction is performed for any density signals lower than the density unevenness offset, SiOFF, at all, it may be possible to perform corrections by arranging the ratio to be reduced to less than the one used for correction of the density signals higher than the offset.

Also, the present invention is not limited to the recording head of the ink jet type, but it is applicable to a thermal head and other heads generally in use.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 (123670/1984) wherein a common slit is used as the ejection outlet for plural electrothermal transducers, and to the structure disclosed in Japanese Laid-Open Patent Application No. 59-138461 (138461/1984) wherein an opening for absorbing pressure moves of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or suction means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in a usual recording apparatus of this type, the ink may be such that it is liquid within the temperature range when the recording signal is applied. Nevertheless, the present invention is also applicable to other types of ink. In one of them, the temperature rise due to the thermal energy is positively prevented by consuming it for the state change of the ink from the solid state to the liquid state. Another ink material is solidified when it is left unused, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 (56847/1979) and Japanese Laid-Open Patent Application No. 60-71260 (71260/1985). The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

According to the present invention, it is possible to correct density unevenness uniformly from the low to high densities as well as to output stabilized images without density unevenness and density streaks in any tonality. Its effects are particularly significant when superposing a plurality of colors to produce the pictorial color images for which the tonal reproducibility is important since the generations of color unevenness and density unevenness are eliminated. Also, for a color copying apparatus and multi-value input color printing apparatus of a serial printing type using a plurality of heads, there are significant effects especially in reducing the periodic noises due to the density unevennesses and connective streaks attributable to the pitches at which the nozzles are arranged for the heads.

What is claimed is:

1. An image forming apparatus, having a recording head with a plurality of recording elements arranged therein for forming images, said apparatus comprising:

first correction means for indicating recording characteristics of the recording elements of said recording head;

second correction means for comparing density signals being supplied to said recording head to a predetermined density, for correcting the density signals being supplied to said recording head on a basis of the recording characteristics indicated by said first correction means and for reducing a degree of said corrections when the density signals are lower than the predetermined density; and driving means for driving the recording head on a basis of density signals corrected by said second correction means.

2. An image forming apparatus according to claim 1, wherein said second correction means does not perform said correction when density signals are lower than the predetermined density.

3. An image forming apparatus according to claim 1, wherein the recording head comprises an ink jet recording head for discharging ink on a recording medium to record.

4. An image forming apparatus according to claim 1, wherein the recording head causes a change in state of ink using thermal energy to eject the ink.

5. An image forming apparatus according to claim 1, wherein a plurality of said recording heads are provided and said first correction means is arranged for each of said recording heads.

6. An image forming apparatus according to claim 3, wherein said plurality of recording heads perform recordings in different colors form color images.

7. An apparatus according to claim 1, wherein the images are recorded by carrying the recording head relatively with respect to a recording medium in a direction different from an arranging direction of said plurality of recording elements.

8. An image forming apparatus, having a recording head with a plurality of recording elements arranged therein for forming images, said apparatus comprising:

means for storing a first correction table for indicating density characteristics of each of the recording elements of said recording head;

means for storing a second correction table for correcting density signals being supplied to said recording head on a basis of the density characteristics indicated by said first correction table; and density correction means for correcting said density signals in accordance with said first correction table and said second correction table, said density correction means correcting said density signals that indicate a density lower than a predetermined density by reducing a degree of correction.

9. An image forming apparatus according to claim 7, wherein in said second correction table, correction amounts for correcting the density signals vary in accordance with magnitudes of the supplied density signals.

10. An image forming apparatus according to claim 7, wherein said second correction table is for non-linear corrections.

11. An image forming apparatus according to claim 8, wherein the recording head comprises an ink jet recording head for discharging ink on a recording medium to record.

12. An image forming apparatus according to claim 7, wherein a plurality of said recording heads are provided and said first correction table for indicating the density characteristics for each of said recording elements is arranged for each of said recording heads.

13. An image forming apparatus according to claim 12, wherein the recording is performed in different colors by each of said recording heads to form color images.

14. An image forming apparatus according to claim 7, further comprising:

test pattern formation means for forming a test pattern on a recording medium;

reading means for reading said test pattern; and calculating means for calculating the density characteristics of each of the recording elements of said recording head in accordance with the test pattern read by said reading means to produce said first correction table.

15. An image forming apparatus according to claim 14, wherein said test pattern formation means forms a plurality of density test patterns; and said calculating means produces said first correction table in accordance with the density characteristics based on plural densities of the plurality of density test patterns.

16. An image forming apparatus according to claim 14, wherein said calculating means determines the density characteristics using an average density of recordings by each of the recording elements of said recording head.

17. An image forming apparatus according to claim 14, wherein said calculating means determines the density characteristics using a standard deviation of densities in each of the recording elements of said recording head.

18. An image forming apparatus according to claim 14, wherein said reading means reads original documents, as well as the test patterns formed by said test pattern formation means.

19. An image forming apparatus according to claim 7, wherein said recording head causes a change in state of ink using thermal energy to eject the ink.

20. An image forming apparatus according to claim 8, wherein the recording head causes a change in state of ink using thermal energy to eject the ink.

21. An apparatus according to claim 8, wherein the images are recorded by carrying the recording head relatively with respect to a recording medium in a direction different from an arranging direction of said plurality of recording elements.

22. An apparatus according to claim 8, wherein said density correction means does not correct any of the density signals that indicate a density lower than a predetermined density.

23. An image forming method for forming an image using a recording head having a plurality of recording elements, said method comprising the steps of:

storing recording characteristics for each recording element of the recording head;

correcting a density signal supplied to the recording head in accordance with the recording characteristics stored in said storing step and reducing a correction degree of the density signal when a density indicated by the density signal is lower than a predetermined density; and driving the recording head in accordance with the density signal corrected in said correcting step.

24. An image forming method according to claim 23, wherein the recording head comprises thermal energy generating means for generating thermal energy to cause a state change in ink to discharge the ink.

25. A method according to claim 19, wherein in said correction step the correction degree is reduced to zero when the density signal is less than the predetermined density.

26. A method according to claim 19, wherein a plurality of recording heads are provided and said correcting step is effected for each recording head.

27. A method according to claim 21, wherein each of the plurality of recording heads records with a different color to form a color image.

28. An image forming method according to claim 19, wherein the recording head comprises an ink jet recording head for discharging ink on a recording medium to record.

29. A method according to claim 23 wherein the images are recorded by moving the recording head relative to a recording medium in a direction different from an arrangement direction of the recording elements of the recording head.

30. An image recording apparatus having a recording head provided with a plurality of recording elements for recording on a recording medium by driving the recording elements in accordance with an image signal, the recording head performing gradation recording in response to image density information in the image signal, said apparatus comprising:

correcting means for correcting the image signal corresponding to each recording element in accordance with recording properties of each recording element, wherein said correcting means changes a degree of correction of the image signal in accordance with a recording image density in the image density information of the image signal corresponding to each recording element.

31. An apparatus according to claim 30, wherein the degree of correction by said correcting means is reduced when the recording image density in the image density information is lower than a predetermined recording image density.

32. An apparatus according to claim 30, wherein said correcting means does not perform the correction when the recording image density in the image density information is lower than a predetermined recording image density.

33. An apparatus according to claim 30, wherein said correcting means performs the correction in accordance with recording properties based on recording results when the plurality of recording elements are driven in a same condition.

34. An apparatus according to claim 30, further comprising driving means for generating a drive signal to drive the plurality of recording elements in accordance with the image signal corrected by said correcting means.

35. An apparatus according to claim 30, further comprising storing means for storing information representing the recording properties of the plurality of recording elements.

36. An apparatus according to claim 30, wherein the recording head comprises an ink jet recording head for discharging ink on the recording medium to record.

37. An apparatus according to claim 30, wherein the recording head comprises thermal energy generating means for generating thermal energy to cause a state change in ink to discharge the ink.

* * * * *